United States Patent [19]

Heinz

[11] 3,995,093

[45] Nov. 30, 1976

[54] GARNET BUBBLE DOMAIN MATERIAL UTILIZING LANTHANUM AND LUTECIUM AS SUBSTITUTION ELEMENTS TO YIELDS HIGH WALL MOBILITY AND HIGH UNIAXIAL ANISOTROPY

[75] Inventor: David M. Heinz, Orange, Calif.

[73] Assignee: Rockwell International Corporation, El Segundo, Calif.

[22] Filed: Mar. 3, 1975

[21] Appl. No.: 554,804

[52] U.S. Cl. .............................. 428/539; 428/900; 252/62.57; 340/174 TF
[51] Int. Cl.² ...................................... G11C 11/14
[58] Field of Search .................. 252/62.57; 428/900, 428/539; 427/128; 340/174 TF

[56] References Cited
UNITED STATES PATENTS 3,886,533   5/1975   Bonner et al. ................ 252/62.57 X

OTHER PUBLICATIONS

Minagawa et al., "Chem. Abstracts", vol. 80, 1974, 88929v.

Gonano et al., "Chem. Abstracts", vol. 67, 1967, 27314a.

*Primary Examiner*—Jack Cooper
*Attorney, Agent, or Firm*—H. Fredrick Hamann; G. Donald Weber, Jr.; Robert Ochis

[57] ABSTRACT

The invention is a substituted garnet bubble domain material in which lutecium and lanthanum have been substituted for yttrium. This material has a high growth-induced uniaxial anisotropy ($K_u^G$).

1 Claim, No Drawings

GARNET BUBBLE DOMAIN MATERIAL UTILIZING LANTHANUM AND LUTECIUM AS SUBSTITUTION ELEMENTS TO YIELDS HIGH WALL MOBILITY AND HIGH UNIAXIAL ANISOTROPY

The invention herein described was made in the course of or under a contract or subcontract with the Air Force.

BACKGROUND OF THE INVENTION

1. Field of the Invention

The invention relates to the field of substituted garnet bubble domain materials.

2. Prior Art

In magnetic bubble domain devices, the smaller the bubble diameter is, the greater is the information storage density which can be achieved. Garnet bubble domain materials have become preferred in the bubble domain art because of the small diameter bubbles which are stable therein. For a bubble domain material to be useful in the production of bubble domain devices, as opposed to being a laboratory curiosity, the bubbles formed in the material must have a high wall mobility in order that relatively small drive fields may cause rapid bubble movement. This characteristic makes a reliable, high frequency operation feasible.

It is also important for magnetic bubble domain material to support bubble domains having high wall energy in order that spontaneous nucleation of bubbles is avoided. Spontaneous nucleation of bubbles must be avoided so that information storage and processing within the bubble domain material will be reliable. In order for the bubble domains within a bubble domain material to have high wall energy, the bubble domain material must exhibit a high uniaxial anisotropy ($K_u$).

The total uniaxial anisotropy ($K_u$) has contributions from cubic (crystal) ($K^c$), stress-induced ($K_u^s$) and growth-induced ($K_u^G$) terms. That is, $$K_u = K^c + K_u^s + K_u^G. \quad (1)$$

The magnitude of the $K^c$ term is generally sufficiently small that it does not provide a useful means of adjusting the value of $K_u$. The magnitude of the stress-induced term ($K_u^s$) is generally limited by the fact that the stress in the bubble domain film must be kept small enough that film cracking does not result. Because of the size of the crystalline and stress terms, it is generally accepted that for a garnet magnetic bubble domain material to have a high enough uniaxial anisotropy to be useful in practical devices, the growth-induced term must be larger than the stress-induced term. Consequently, in order to produce a high uniaxial anisotropy ($K_u$) it is preferred that the growth-induced term ($K_u^G$) be made relatively large. In selecting ions to substitute for yttrium in a bubble garnet composition in an attempt to increase the growth induced anisotropy, the selection was in the past limited to magnetic rare earth ions because the accepted theory for growth anisotropy required the use of magnetic ions.

DETAILED DESCRIPTION OF THE PREFERRED EMBODIMENT

A bubble domain composition in which lanthanum and lutecium have been substituted for yttrium provides high bubble domain wall mobility which is desirable for high frequency operation of bubble domain devices. This composition yields a high growth induced uniaxial anisotropy ($K_u^G$) which provides sufficient bubble domain wall energy to allow stable device performance without danger of spontaneous nucleation of bubbles.

A preferred composition for maximizing the growth induced anisotropy is $Lu_xLa_{3-x}Ga_yFe_{5-y}O_{12}$. However, elements other than gallium may be substituted for iron in reducing the magnetization of the resulting garnet, thus a more general formulation for this material is $Lu_xLa_{3-x}Q_yFe_{5-y}O_{12}$, where Q is a non-magnetic ion which preferentially substitutes on the tetrahedral lattice sites and $0<x<3$ and $0<y<5$ and $5-y$ is sufficiently large that the material is magnetic at the operating temperature. Where the iron substitution is achieved with an ion having a charge of greater than +3, charge compensation may require that a charge compensating ion be included with the lanthanum and lutecium in the substitution of yttrium, thus yielding a material of the composition $Lu_xLa_{3-x-z}J_zQ_yFe_{5-y}O_{12}$ where J is a charge compensating ion which has a charge of +1 or +2 and which preferentially substitutes on the dodecahedral lattice sites, Q is a nonmagnetic ion which has a charge greater than +3 and which preferentially substitutes on the tetrahedral lattice sites and $0<x<3$, $0 \leq z<3$, $0<x+z<3$ and $0<y<5$, where preferably $z=0$ when charge compensation is not required. Here again the material must be magnetic at the operating temperature. It will be noted that the formulation $Lu_xLa_{3-x-z}J_zQ_yFe_{5-y}O_{12}$ reduces to $Lu_xLa_{3-x}Q_yFe_{5-y}O_{12}$ when $z=0$. This is the general formulation for this material where Q has an ionic charge of +3.

The high growth-induced uniaxial anisotropy ($K_u^G$) is believed to be a result of the fact that lanthanum is the largest of the rare earth ions and that lutecium is the smallest of the rare earth ions. Thus, where charge compensation is required, it is preferred to select a charge compensating ion whose size is compatible with this method of increasing the growth induced anisotropy.

The high bubble domain wall mobility in this material is a result of the fact that both lanthanum (La) and lutecium (Lu) have very low values of the damping parameter. These low values of damping parameter result at least in part from the fact that these ions are non-magnetic. This high bubble domain wall mobility allows high frequency operation of bubble domain devices utilizing this material.

For growth on a gadolinium gallium garnet (GGG) substrate, a nominal composition of $Lu_{2.27}La_{0.73}Ga_{1.1}Fe_{3.9}O_{12}$ is preferred because it provides a small mismatch between the lattice constant of the bubble domain film and the lattice constant of the GGG substrate, thus keeping the stress in the film at a small enough value that the danger of film cracking and crazing is minimized. However, stress-induced anisotropy is still produced, so long as the stress is non-zero. As is apparent from the formulation of this material, it is intended that the lanthanum and lutecium substitute only on the dodecahedral lattice sites. Similarly, it is desired to restrict the gallium substitution to the tetrahedral lattice sites. If the substitution of the lanthanum and lutecium is restricted to the dodecahedral lattice sites and the gallium substitution is restricted to the tetrahedral lattice sites, then the resulting magnetic bubble domain film has a maximum Neel temperature consistent with the designed magnetization of the material of 100–150 Gauss.

A film designed to have the nominal composition $Lu_{2.27}La_{0.73}Ga_{1.1}Fe_{3.9}O_{12}$ was grown by liquid phase epitaxy techniques from a melt utilizing a $PbO/B_2O_3$ flux. The melt from which this film was grown had a saturation temperature of 875° C. The film was grown at a temperature of 855° C for a period of 20 minutes while the substrate was rotated at 100 rpm. The film thickness was 2.15 μm.

This film has a higher magnetization (212 Gauss) and a lower Neel temperature (about 100.5° C) than is expected in view of the designed gallium content of this film.

The Faraday effect shows that this high net magnetization is a result of the tetrahedral ion sublattice. Therefore, the excess substitution for iron which caused the lower than designed Neel temperature is believed to have taken place on the octrahedral iron sites. Consequently, it has been concluded that as a result of its small size, some of the lutecium substituted on the octrahedral lattice sites rather than on the dodecahedral lattice sites to which it was desired to restrict the lutecium.

From static bubble domain properties, a bubble domain wall energy value of 0.113 erg/cm$^2$ was obtained. From the Neel temperature, an exchange constant of $A=1.17\times10^7$ erg/cm was calculated. The wall energy ($\sigma_w$) obeys the following relationship:

$$\sigma_w = 4(AK_u)^{1/2} \qquad (2)$$

solving for $K_u$ yields:

$$K_u = \frac{\sigma_w^2}{16A} \qquad (3)$$

Substituting the above values of $\sigma_w$ and A into equation 3 yields a value of approximately 6800 erg/cm$^3$. From this value of $K_u$ the value of the growth-induced anisotropy was calculated once the values of $K^c$ and $K_u^s$ were determined. From the Neel temperature, it was concluded that the film was approximately equivalent to a substituted YIG with a gallium content of 1.2 for purposes of calculating the cubic anisotropy. $K^c$ was determined to have a value approximately equal to 300 erg/cm$^3$.

The lattice mismatch between the bubble domain film and the GGG substrate was determined by double crystal rocking curve data to have a mismatch of $\Delta a^\perp = 0.0182$A or $\Delta a^\parallel = 0.0100$A. This is equivalent to a stress ($\sigma$) of $2.30\times10^9$ dy/cm$^2$. The magnetostriction constant ($\lambda_{111}$) of a substituted YIG with a gallium content of 1.2 is approximately $-0.38\times10^{-6}$. From these values of $\sigma$ and $\lambda_{111}$, the stress induced anisotropy $K^s$ was determined to have a value of approximately 1300 erg/cm$^3$. Substituting the above values for $K_u$, $K^c$, and $K^s$ into equation 1 yields a value of $K_u^G$ of approximately 5200 erg/cm$^3$. Thus, this material has a high growth induced anisotropy and the value of wall energy in this material is sufficient to provide reliable bubble domain devices.

A new bubble domain material has been provided which has useful bubble domain properties. It will be understood, that the preferred embodiment has been described. Those skilled in the art may be able to vary the composition of this film using the general formulation $Lu_xLa_{3-x-z}J_zQ_yFe_{5-y}O_{12}$ without departing from the scope of the invention. Thus, the example is illustrative only and is not intended to be limitative.

What is claimed is:
1. A bubble domain composite comprising:
a gadolinium gallium garnet substrate; and
an epitaxial bubble domain film supported by said substrate, said bubble domain film having a nominal composition of substantially $Lu_{2.27}La_{0.73}Ga_{1.1}Fe_{3.9}O_{12}$.

* * * * *